United States Patent [19]

Bunch

[11] 4,315,671
[45] Feb. 16, 1982

[54] LENTICULATED LENS

[76] Inventor: Jesse C. Bunch, 816 Easley St., Silver Spring, Md. 20910

[21] Appl. No.: 838,729

[22] Filed: Oct. 3, 1977

[51] Int. Cl.³ .............................................. G02B 3/08
[52] U.S. Cl. .................................. 350/451; 126/438; 126/440
[58] Field of Search .............. 350/211, 213, 286, 202; 126/438, 440

[56] References Cited

U.S. PATENT DOCUMENTS

| | | | |
|---|---|---|---|
| 3,254,556 | 6/1966 | Staunton | 350/286 |
| 3,661,385 | 5/1972 | Schneider | 350/202 |
| 3,861,785 | 1/1975 | Barbour | 350/211 |
| 4,082,433 | 4/1978 | Appeldorn et al. | 350/211 |

*Primary Examiner*—John K. Corbin
*Attorney, Agent, or Firm*—Morton J. Rosenberg

[57] ABSTRACT

A lens based on the concentration of electro-magnetic radiation through combined reflective and refractive properties of the lens. In one form of the lenticulated lens, radiation impinges and is transmitted through a substantially planar frontal surface. The incident radiation subsequent to being transmitted through the frontal surface impinges on a rear inclined surface forming a portion of the lenticulated rear surface of the lens. The ray is reflected from the mirror coated inclined surface and is egressed from the frontal surface and is refracted to a focus line. The incident rays impinging on the frontal surface are thus directed to the linear focus line when the lenticulations of the lens are linearly directed. By providing refraction and reflection passage of the incident rays from and through the lens, the reflected portion of the incident ray which is focused to a line focus is maximized.

23 Claims, 9 Drawing Figures

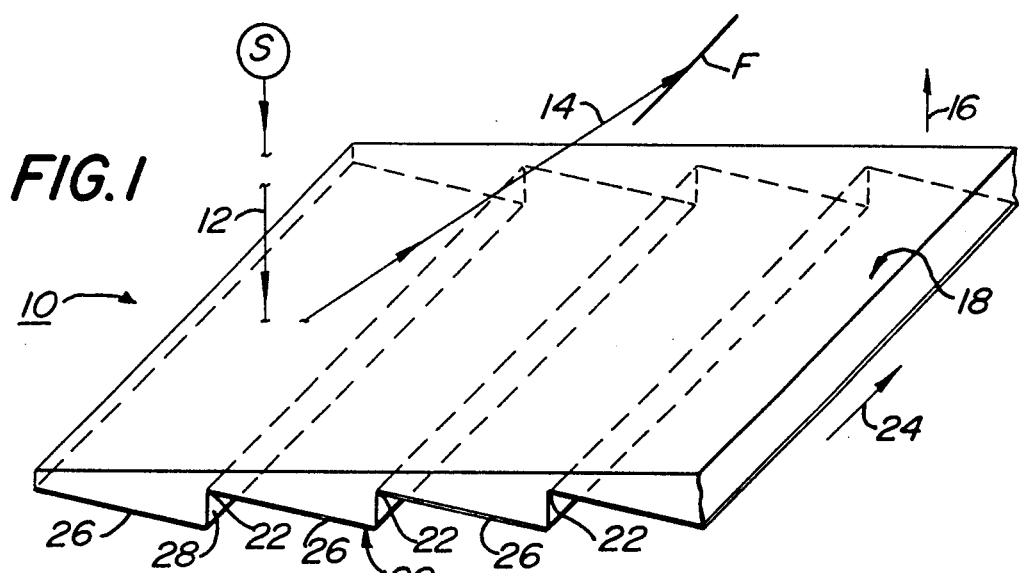
FIG.1
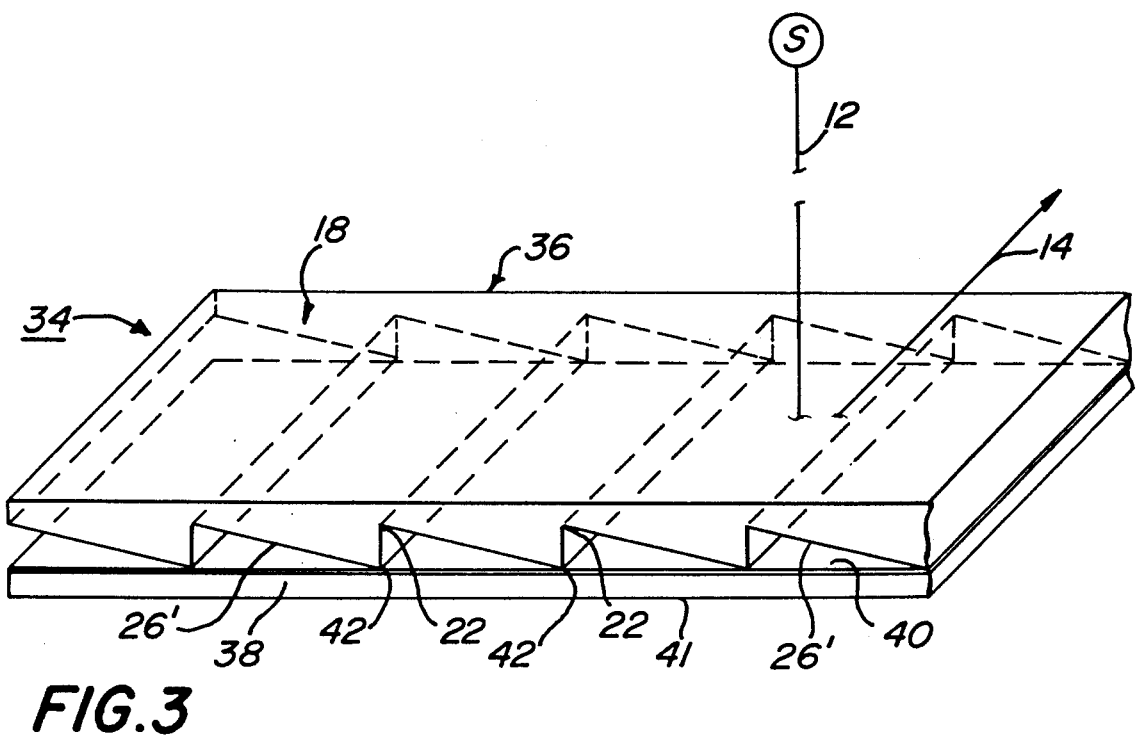
FIG.2
FIG.3

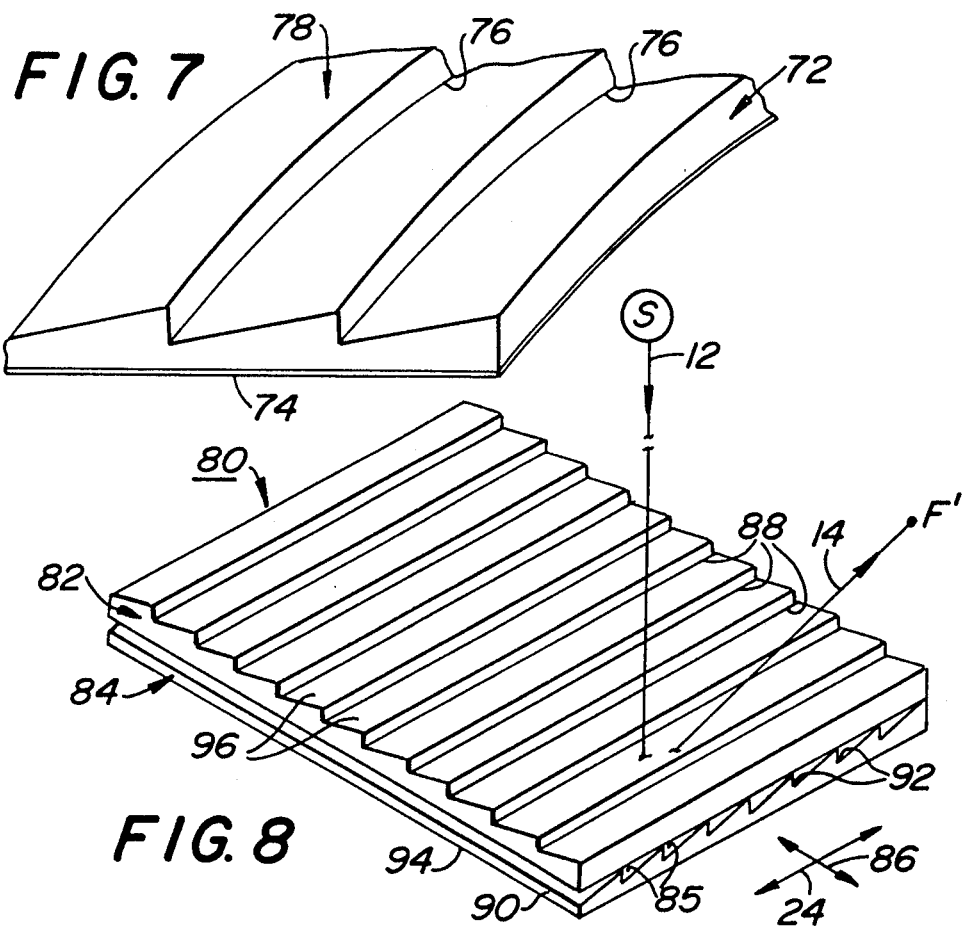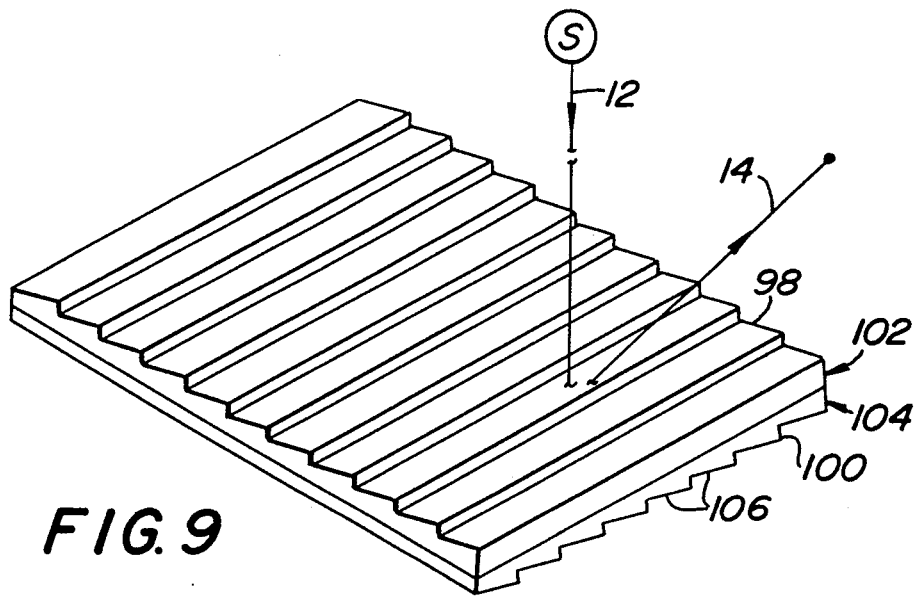

4,315,671

LENTICULATED LENS

BACKGROUND OF THE INVENTION

1. Field of the Invention

This invention relates to the field of electro-magnetic radiation concentrating systems. In particular, this invention pertains to the field of lenses. Still further, this invention relates to the field of refracting mirror type lenses. More in particular, this invention relates to the field of Fresnel type lenses modified to provide both refraction and reflection of incident radiation impinging on the lens.

2. Prior Art

Multi-lenticulated lenses are known in the art. Additionally, Fresnel type lenses for producing either a line focus or a point focus are also known in the prior art. However, Fresnel type lenses when utilizing linear lenticulations have been provided as reflecting surfaces. In such prior art lenses, the inclined surfaces facing the source of the incident radiation have been mirror coated to provide a direct reflection mode of the radiation to either a point focus or a line focus. In such prior art lenses, the reflected radiation has been interfered with by successive lenticulation walls thus reducing the amount of reflected energy which is either directed to the line or point focus. This has caused a low efficiency of the concentration effect of the useful incident radiation.

Additionally, in prior art Fresnel type reflecting lenses, the inclined surfaces facing the source of radiation provides a series of surfaces which are exposed to the ambient environment and has been found to be contaminated with various particulates. Where the inclined surfaces are mirror coated, extreme care must be taken when cleansing such surfaces. This cleansing of the surfaces is a difficult and time consuming operation which increases the overall operating cost of such lens configurations.

BRIEF DESCRIPTION OF THE DRAWINGS

FIG. 1 is an isometric view of a multi-lenticulated lens showing the incident radiation impinging on a planar surface prior to transmission through the lens and reflection from a rear inclined surface;

FIG. 2 is a section view of one lenticulation of the lens provided in FIG. 1 taken along the section line 2—2;

FIG. 3 is an embodiment of the lens shown in FIG. 1 taken in perspective view providing a refractive Fresnel type lens mounted on a planar mirrored surface;

FIG. 7 is an embodiment of the invention showing a lenticulated surface frontally directed toward a source of radiation and having a mirrored back with arcuately formed lenticulations;

FIG. 8 is a lens system taken in perspective showing a pair of lenticulated lenses utilizing both refraction and reflection modes of radiation transmission; and, FIG. 9 is an embodiment of the invention taken in perspective showing a pair of lenticulated lenses having orthogonally extended lenticulations when taken each with respect to the other.

DESCRIPTION OF THE PREFERRED EMBODIMENTS

Figure 4:
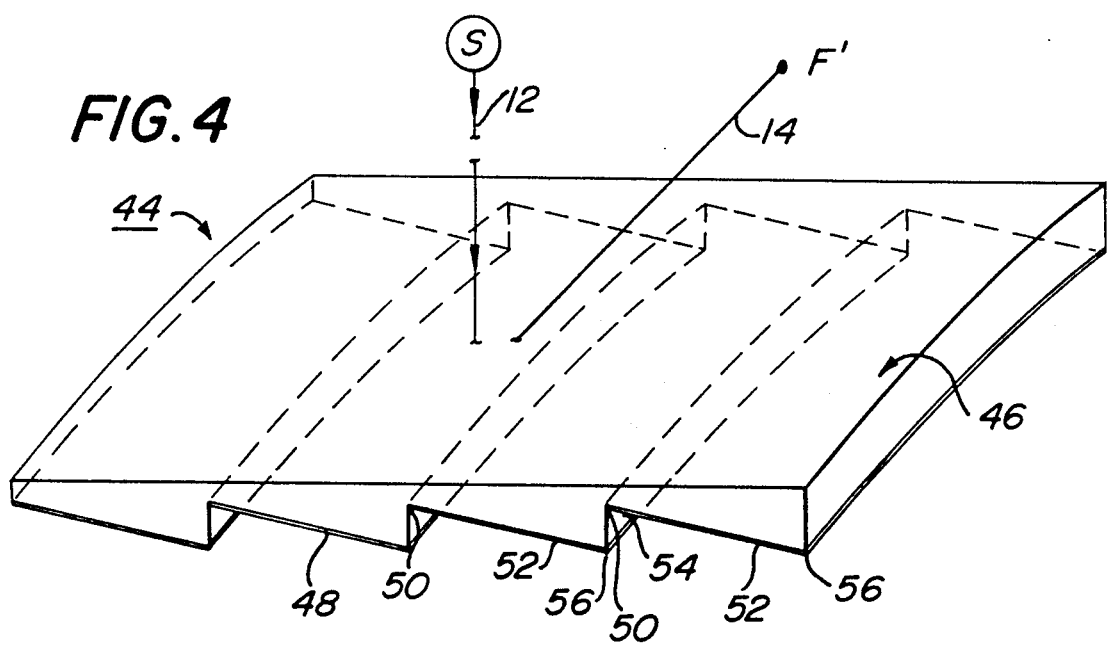
FIG. 4 is a perspective view of a lens having circular lenticulations and a planar surface upon which incident radiation impinges and is refracted to a rear inclined mirrored surface.

Referring now to FIGS. 1 and 2, there is shown multi-lenticulated lens 10 for reflecting incident electro-magnetic radiation 12 from a source S to a linearly directed focus F through reflected radiation 14. In overall concept, multi-lenticulated lens 10 is directed to a system for the concentration of electro-magnetic radiation to a focus line F or a focal point through use of optical refraction in combination with optical reflection. Thus, lens 10 is utilized for concentration of reflected radiation 14 to some line or point spatially located frontally of lens 10 as defined by frontal directional arrow 16. However, it is an important concept of the subject inventive system that incident electro-magnetic radiation 12 is not merely reflected from multi-lenticulated lens 10 to linear focus F but rather is provided with an initial refraction, reflection from a predetermined surface of lens 10 before emerging from an internal segment of lens 10 to result in reflected radiation 14.

Lens 10 as is herein described is of the Fresnel type. In this meaning, as is provided in the instant inventive concept, Fresnel type lenses shall include a lens system which has a plurality of lenticulations formed within at least one surface portion thereof. The lenticulations of the Fresnel type lens, as will be seen in following paragraphs, may be linearly directed or may be arcuate for some embodiments as is herein described.

One of the important uses of the lens system as is herein provided is in solar heat concentration areas of concern. In this vein, the source S may be the sun and focal line F may be in general any heat concentrating focus line where a multiplicity of incident radiation rays 12 may be focused. Thus, lens 10 may be utilized in a solar tracking system utilizing conventional kinematic mechanisms to focus reflected rays 14 into a particular focus line F. Lens 10 may be fixed, such as on the wall of a building, to redirect focused rays impinging on the lens 10 from a heliostat system.

Lens 10 as shown in FIGS. 1 and 2 includes frontal surface 18 which is at least partially transmissive to incident radiation 12. Frontal surface 18 may be planar in contour throughout the plane of surface 18. Additionally, when Fresnel type lens 10 is utilized for solar energy reflection, frontal surface 18 is generally maintained in a plane normal to incident radiation 12. Additionally, it is to be understood, that a lens system may be formed of a plurality of frontal surfaces 18, at least one of which being inclined at a predetermined angle to solar flux radiation rays 12.

Lens 10 includes rear surface 20 formed of a plurality of linearly directed lenticulations 22. As can be seen from FIG. 1, lenticulations 22 extend linearly in transverse direction 24. Rear surface 20 as defined by lenticulations 22 include inclined surfaces 26 when taken with respect to a plane defined by frontal surface 18 and a plurality of surface areas 28 defining the boundary between one lenticulation 22 and a successive lenticulation 22. For purposes of illustration, surfaces 28 in FIGS. 1-9 are depicted as being vertically directed. However, it is to be understood that the concept as herein presented is meant to encompass surfaces 28 being possibly inclined with respect to frontal plane 18 as well. Each of inclined surfaces 26 is adapted to reflect radiation. Inclined surfaces 26 may be mirror coated with a high reflective aluminum or some like mechanism to provide a substantially mirror-like reflection coating. Additionally, inclined surfaces 26 are seen in FIGS. 1 and 2 to be linearly inclined with respect to a plane defined by frontal surface 18. However, it will be understood, that inclined surfaces 26 may be arcuately inclined in the form of a parabola or some like arcuate contour. In a similar manner, surfaces 28 may additionally be adapted to reflect radiation with a mirror-like coating. The reflection properties associated with surfaces 28 are particularly advantageous when surfaces 28 are inclined as has hereinbefore been described.

The provision of providing a planar frontal surface 18 and a lenticulated rear surface 20 which is mirror coated in a Fresnel lens 10 is particularly advantageous when lens 10 is utilized in a sun tracking system. It is understood that lens 10 may be exposed to the surrounding ambient atmosphere. Thus, frontal surface 18 may become contaminated with dust particulates or other contamination type particles evolving in the surrounding atmosphere. It is thus particularly advantageous to provide a planar type frontal surface 18 exposed to such contaminants in order that surface 18 may be easily cleansed or otherwise have such particulates removed from an optical surface. Additionally, the reflecting surfaces 26 are essentially facing the internal portion of lens 10 and are not subjected to particulate contamination. If inclined surfaces 26 were exposed to the ambient atmosphere, it is clearly seen that the cleaning process due to the lenticulations 22 would be increasingly difficult. Still further, it is easily seen that inclined surfaces 26 would present a cleansing problem due to the fact that as an overall surface, rear surface 20 is non-planar.

Of further consideration and most importantly, the back mirror coatings applied to inclined surfaces 26 defines a unique change in the optical properties of incident and reflected radiation rays 12 and 14 respectively. It has been found, that where frontal surface 18 is the lenticulated surface and particularly where this lenticulated surface is the reflecting surface, that reflected radiation 14 is diminished in flux density when focus line F measurements are made. This is caused by the fact that a large portion of reflected radiation rays 14 are lost in that their linear path is obstructed by a next vertical surface 28 of a next consecutive lenticulation 22. This has the effect of reducing the amount of incident radiation 12 emanating from source S which is focused on linear line F.

FIG. 2 is a schematic optical ray diagram showing the path of incident radiation ray 12 impinging on frontal surface 18 resulting in transmission ray 30 passing through the width of lens 10 for impingement and reflection from inclined surface 26 which is mirror coated. Transmission ray 30 is transformed after reflection into transmission/reflection ray 32 and results in reflected radiation 14 after passage through the width of lens 10. As is evident, when surface 18 is normal to ray 12, transmission ray 30 is not refracted upon passage therethrough. As is seen in FIG. 2, the letter characters CDE defines the cross-section triangular configuration of one lenticulation. Inclined surface 26 is mirror coated in conformity with the instant concept and the portion of planar frontal member 18 defined by the extension CE is optically transmissive. Incident radiation 12 impinges substantially normal to frontal planar member 18 and passes through with no refraction due to the substantially normal impingement.

Reflection of ray 30 from surface 26 occurs at reflection point A. Due to the geometry of the system and the well-known reflection laws it is seen that:

$$\theta_1 + \alpha = 90° \quad (1)$$
$$\theta_1 = \theta_2$$

Construction line 27 is formed perpendicular to inclined surface 26 and intersects same at point A. Thus, from equation (1) it is evident that:

$$\angle HAB = \alpha \quad (2)$$
$$\angle BAI = \alpha$$

Formation of construction line IJ parallel to line HA intersects frontal member 18 at radiation egress point I. From plane geometry:

$$\angle AIJ = \angle HAI \quad (3)$$
and:
$$\angle HAI = \angle HAB + \angle BAI \quad (4)$$
$$= \alpha + \alpha = 2\alpha$$

From Snell's Law:

$$N = \frac{\sin \dot{\imath}}{\sin (AIJ)} = \frac{\sin \dot{\imath}}{\sin (2\alpha)} \quad (5)$$
$$(N) \sin 2\alpha = \sin \dot{\imath} = \frac{X}{\sqrt{X^2 + f^2}}$$
$$\alpha = \frac{1}{2} \left( \sin^{-1} \left( \frac{1}{N} \frac{X}{\sqrt{X^2 + f^2}} \right) \right)$$

This defines the lenticulation of the subject concept. In opposition, where the lenticulation sides are mirrored and pure reflection occurs the lenticulation is seen to be:

$$\alpha_p = \frac{1}{2} \left( \sin^{-1} \left( \frac{X}{\sqrt{X^2 + f^2}} \right) \right) \quad (6)$$

Thus, by inspection of equations 5 and 6 it is seen that lenticulations $\alpha$ are less than $\alpha_p$ to provide a more focused radiation image for the subject concept.

Referring now to FIG. 3, there is shown another embodiment of the basic lens 10 as provided in FIGS. 1 and 2. In this embodiment, lens system 34 is composed of refractive Fresnel type lens 36 in combination with planar member 38. Planar member 38 includes a mirror coated frontal surface 40 or mirror coated rear surface 40 for reflection purposes. Planar member 40 interfaces with refractive Fresnel type lens 36 at least some of the apices 42 of lenticulations 22 extending in direction 24. In this lens system 34, inclined surfaces 26' are substantially transmissive to radiation 12. Thus, incident radiation 12 from source S generally passes through up frontal planar surface 18, is transmitted to lower inclined surface 26', then passes through a refraction until it is reflected from mirror surface 40 or 41 of planar member 38 wherein it is reversibly passed through refractive Fresnel lens 36 to be emitted as reflected ray 14.

This embodiment as shown in FIG. 3 includes an additional refractive passage of the radiation in that the radiation is emitted from inclined surfaces 26' through a medium such as air to reflective surface 40 and then is displaced reversibly into lens 36. However, it has been found that there is slight diminution of the focused radiation flux on linear focus line F in this embodiment.

Referring now to FIG. 4 there is shown an embodiment of the invention where the concept of refraction and reflecting rays utilized in combination are provided to redirect an incident electro-magnetic radiation ray 12 from a source S to a reflected radiation ray 14 on a point focus F'. In this embodiment, circularly lenticulated lens 44 is utilized for refraction and reflection of incident radiation 12. Circularly lenticulated lens 44 includes frontal surface 46 and rear lenticulated surface 48. Frontal surface 46 is generally planar in contour and lies in a plane substantially normal to radiation rays 12 from source S when circularly lenticulated lens 44 is utilized in solar reflection uses. Rear surface 48 includes arcuately directed lenticulations 50 which are defined by inclined reflective surfaces 52 and wall members 54. As was the case of surfaces 28 shown in FIG. 1 wall members 54 may be inclined with respect to a horizontal plane. Inclined surfaces 52 may be adapted to reflect electro-magnetic radiation through a mirror coating such as a highly polished aluminum or some like material and/or technique well-known in the art. The advantages found in the utilization of circularly lenticulated lens 44 is similar to those advantages as has hereinbefore been provided when a description of multi-lenticulated lens 10 having linearly directed lenticulations 22 were discussed. In this lens system 44, incident radiation 12 is initially passed through substantially transmissive surface 46 and is transmitted to mirror coated surfaces 52 of rear surface 48. The refracted ray is then reflected from inclined surfaces 52 and exits frontal surface 46 is reflected electro-magnetic wave 14. As was the case in lens 10 of FIGS. 1 and 2, circularly lenticulated lens 44 may be provided with a planar member interfacing with apices 56. The planar member although not shown may be mirror coated in much the same manner as planar member 38 shown in FIG. 3. In this case, there would be an additional refractive phase of electro-magnetic radiation with some loss of focusing at focus point F'. However, this loss of the focusing point F' may be advantageous in that inclined surfaces 52 which may be linear or parabolic in nature would not have to be mirror coated and thus there would be a lower manufacturing cost.

Figure 5:
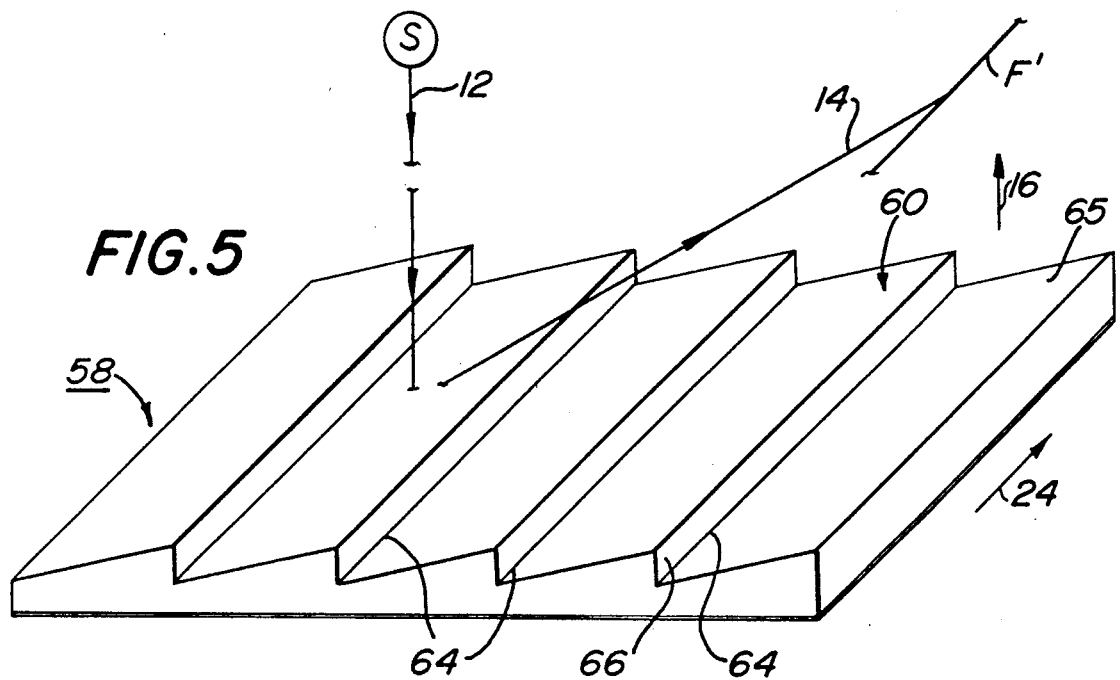
FIG. 5 is a perspective of an embodiment of the invention showing a frontal linearly lenticulated surface having a mirror coating rear surface of planar contour.
Figure 6:
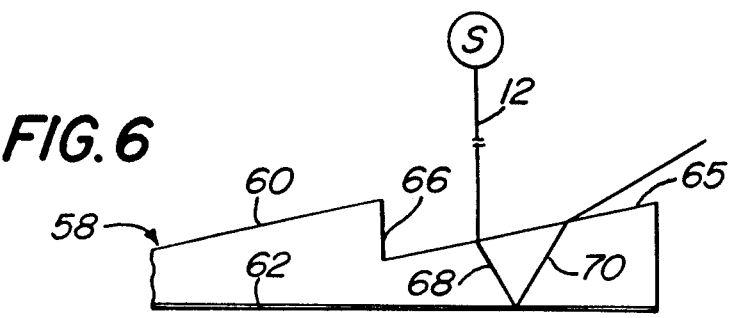
FIG. 6 is a sectional view of FIG. 5 taken along the section line 6—6.

Referring now to FIGS. 5 and 6, there is shown a still further embodiment of the inventive concept where radiation concentration is affected through use of both a refractive and reflective transport mode to produce a linear focusing F. In FIGS. 5 and 6, Fresnel type lens 58 includes lenticulated frontal surface 60 and opposing rear surface 62. Frontal surface 60 includes a plurality of linearly directed lenticulations 64 in transverse direction 24. Further, frontal surface 60 includes inclined radiation transmissive surfaces 65 to permit passage of incident radiation 12 therethrough. Surfaces or walls 66 may be vertically directed or formed at some angle to planar rear surface 62.

Rear surface 62 is adapted to reflect refracted rays 68 through a mirror backed coating such as polished aluminum or some like material. In this embodiment, it is seen that incident electro-magnetic radiation 12 after passage through inclined surface 65 becomes refracted ray 68 which is then reflected from rear surface 62 to produce refracted/reflected ray 70 before emergence from inclined surface 65 to form reflected ray 14.

As was the case in the preferred concepts shown in FIGS. 1-4, Fresnel type lens 58 may be formed in one piece formation of an optically refractive type of material such as glass, plastic, or some like material.

FIG. 7 shows a circularly lenticulated Fresnel type lens 72 which is analogous to Fresnel type lens 58 in the same manner as lens 44 shown in FIG. 4 is in relation to lens 10 provided in FIGS. 1 and 2. Circularly lenticulated lens 72 of FIG. 7 includes planar mirror coated back or rear surface 74 having lenticulations 76 of an arcuate nature or contour to provide focusing to a point focus in opposition to the line focus F shown in FIGS. 5 and 6. The reflection/refraction optical parameters for circularly lenticulated lens 72 are similar to those provided for linearly directed lens 58. Although in FIGS. 5-7, frontal surfaces 60 and 78 are lenticulated and exposed to the ambient environment, it is noted that the mirrored surfaces 62 and 74 are not exposed and thus such may be maintained in a relatively easily cleansed fashion compared to the frontal surfaces themselves being mirror coated. Once again, in the embodiments shown in FIGS. 5-7, there is a lower amount of radiation which is impinged or blocked by successive or consecutively spaced lenticulation surfaces when taken with respect to the lenticulated surfaces themselves being mirror coated. This has the effect of increasing the radiation concentration at either a point or a line focus.

Referring to FIGS. 1-3, it is to be understood that planar surface 18 may additionally be linearly lenticulated in a direction coincident with the lenticulations 22. Further, in FIGS. 5 and 6, surface 62 may be lenticulated in a direction coincident with lenticulations 65. Similarly, in FIG. 4, surface 46 may be formed of arcuately directed lenticulations and mirrored surface 74 of FIG. 7 may include similarly directed arcuate lenticulations.

Referring now to FIG. 8, there is shown combined lens system 80 including frontal lens 82 and rear lens 84. As will be seen in following paragraphs, combined lens system 80 is provided for ultimate reflection of incident electro-magnetic radiation 12 from source S to focus point F' by reflected radiation ray 14. Frontal lens 82 includes a plurality of linearly directed lenticulations 88 formed in transverse direction 24. Rear lens 84 is mounted to rear surface 90 of frontal lens 82 in contiguous mating contact through adhesive bonding or some like technique. It is to be understood that particular refractive materials may be inserted between frontal lens 82 and rear lens 84 within interstices 85 shown in FIG. 8. Frontal lens 82 is optically or radiation transmissive to provide refraction of incident ray 12 in passage through frontal lens 82.

Rear lens 84 includes a plurality of linear lenticulations 92 passing in longitudinal direction 86. Although lenticulations 92 of rear lens 84 are generally linearly directed substantially normal or perpendicular to the extension direction of lenticulations 88 of frontal lens 82, it is within the scope of the concept as herein described to permit lenticulations 92 and 88 to be formed at any predetermined angle between coincidence of the lenticulations and perpendicularity of the lenticulations. It has been found that through the use of a pair of mutually angled lenticulation directions of frontal lens 82 and rear lens 84, that incident electro-magnetic radiation 12 may be focused to a point focus F'. Rear lens 84 includes rear surface 94 which is generally planar in contour and is mirror coated through highly polished aluminum deposition or some like material. Lens system 80 thus provides a system whereby the reflective properties of a lens may be utilized in combination with refractive concepts as has hereinbefore been described to produce a concentration of reflected rays 14 to a point focus F'. Combined lens system 80 is of significance since linearly directed lenticulations such as those provided by 88 and 92 are of a low cost consideration manufacturing item. Such linear lenticulations may be formed by embossing or in large plane contours may be formed by mill cutting, pressing, rolling, or other means which is inexpensive when compared to circular engraving or other arcuate contours which are now provided for formation of Fresnel type lenses in directing incident radiation to a point focus.

As is evident, rear lens 84 may be frontally directed toward source S and be provided as a completely refractive type lens. In this type of case, frontal lens 82 would then be displaced rearward from source S and inclined surfaces 96 would be mirror coated for reflection of refracted radiation rays. It has been found that this arrangement of lenses 82 and 84 also provides for focus to a focus point F'. The important consideration being that combined lens system 80 utilizes two lenses 82 and 84 having linearly directed lenticulations 88 and 92 which are inclined each with respect to the other. The mutually inclined lenticulations 88 and 92 when provided with one lens 82 or 84 being refractive in nature and a second lens 82 or 84 having a surface reflection area, provides for the advantages of maximizing the incident radiation 12 into a concentrated reflected ray 14 at a focus point F'.

FIG. 9 is directed to an embodiment of combined lens system 80 shown in FIG. 8 where lenticulations 98 and 100 of matingly interfacing lenses 102 and 104 are orthogonally displaced each with respect to the other. In the embodiment shown in FIG. 9, lenses 102 and 104 matingly engage along an interface line defining planar contours. Additionally, in the arrangement shown, rear lens 104 includes a series of inclined surfaces 106 which are mirror coated to provide the necessary reflective properties. Thus, incident radiation 12 is refractively passed through lens 102 and 104 to impinge and be reflected from lenticulated surfaces 106 of lens 104. The important consideration being that lenticulations 98 of lens 102 and lenticulations 100 of lens 104 are formed inclined each to the other to provide concentration to focus point F', when taken in combination with the refractive/reflective concept of radiation passage as has hereinbefore been described.

In overall concept, one linearly lenticulated lens may be placed in combination with a second element to focus frontally to at least one point. The lens and element may be positioned contiguous each to the other or lenticulations may be formed on opposing surfaces of the entire lens system or alternatively one set of lenticulations may be positioned interior the lens system adjacent the other element.

For purposes of optical advantages as well as mechanical feasibility, it may be advantageous to present a substantially planar surface to external source S. Thus, where the lenticulations of lens 10 are exposed to the external environment, the interstices between successive lenticulations may be filled with particular refractive materials. Additionally, where the interstices are opposed to a surface facing the source S, such may be filled with refractive or other material to provide advantageous mechanical properties for lens 10.

In other embodiments, lenticulated surfaces of the herein described lenses may be contoured in a linear hyperbolic, parabolic, circular, toroidal or other arcuate contour.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described. Certain structures may be used independently of others, and in certain cases particular locations of elements may be reversed or interposed, all without departing from the spirit or the scope of the invention as defined in the appended claims.

What is claimed is:

1. A radiation concentrating lens for concentrating incident radiation to a positive focus, comprising:
   (a) a substantially planar frontal surface being at least partially radiation transmissive for passage of said incident radiation therethrough; and,
   (b) at least two substantially planar inclined rear surfaces of said lens, each of said rear surfaces having non-parallel envelope contours with respect to said frontal surface, said non-parallel envelope contours being inclined each with respect to the other for concentrating said incident radiation to said positive focus, said incident radiation passing through said frontal surface being substantially devoid of refraction prior to reflection on said inclined rear surfaces.

2. The radiation concentrating lens as recited in claim 1 where said rear surface of said lens is lenticulated to provide multiplicity of lenticulations forming a plurality of reflective rear surfaces.

3. The radiation concentrating lens as recited in claim 2 where said inclined rear surfaces are arcuately contoured in the plane of said substantially planar inclined rear surfaces.

4. The radiation concentrating lens as recited in claim 2 where said arcuately contoured lenticulations include a plurality of circular lenticulations.

5. The radiation concentrating lens as recited in claim 2 where said inclined rear surfaces are reflectively coated.

6. The radiation concentrating lens as recited in claim 2 where said lens is formed in one piece construction.

7. A radiation concentrating lens system for concentrating incident radiation to a positive focus comprising:
   (a) a first frontal linearly lenticulated lens element having lenticulations extending in a first direction, said first lens being at least partially transmissive to said radiation, and,
   (b) a second rear element, said second rear element having a surface adapted to reflect radiation impinging thereon, said second rear element being a linearly lenticulated surface having lenticulations extending in a second direction, said first and second lens elements being mounted each to the other in a contiguous manner.

8. The radiation concentrating lens system as recited in claim 7 where said first frontal lens includes:
   (a) a first lenticulated surface having lenticulations extending in said first direction; and,
   (b) a second rear surface being planar in contour, said first lens being at least partially transmissive to said incident radiation.

9. The radiation concentrating lens as recited in claim 8 where said second rear lens includes:
(a) a first lenticulated surface having lenticulations extending in said second direction, said first lenticulated surface being contiguous said second rear surface of said first frontal lens; and,
(b) a second rear surface of said second rear lens being adapted to reflect radiation impinging thereon.

10. The radiation concentrating lens system as recited in claim 9 where said second rear surface of said second rear lens is planar in contour.

11. The radiation concentrating lens system as recited in claim 9 where said first lenticulation direction is non-coincident with said second lenticulation direction.

12. The radiation concentrating lens system as recited in claim 11 where said first lenticulation direction is substantially normal said second lenticulation direction.

13. The radiation concentrating lens system as recited in claim 7 where said second rear lens includes:
(a) a first planar contour surface being contiguous said second rear surface of said first frontal lens; and,
(b) a second lenticulated surface having lenticulations extending in said second direction, said second lenticulated surface being adapted to reflect radiation impinging thereon.

14. The radiation concentrating lens system as recited in claim 13 where said second surface of said second lens is reflectively coated.

15. The radiation concentrating lens system as recited in claim 13 where said first lenticulation direction is non-coincident with said second lenticulation direction.

16. The radiation concentrating lens system as recited in claim 15 where said first lenticulation direction is substantially normal said second lenticulation direction.

17. The radiation concentrating lens system as recited in claim 7 where said frontal lens includes:
(a) a first planar surface being at least partially transmissive to said incident radiation; and,
(b) a second rear surface being lenticulated in said first direction, said second rear surface being at least partially transmissive to said radiation.

18. The radiation concentrating lens system as recited in claim 17 where said second lens includes opposing first and second surfaces, said second surface being lenticulated in said second direction.

19. The radiation concentrating lens system as recited in claim 18 where said second lenticulated surface of said second lens is contiguous said second rear surface of said first frontal lens.

20. The radiation concentrating lens as recited in claim 19 where said first surface of said second lens is reflectively coated.

21. The radiation concentrating lens system as recited in claim 18 where said first surface of said second lens is contiguous said second rear surface of said first frontal lens, said first surface of said second lens being substantially planar in contour.

22. The radiation concentrating lens system as recited in claim 21 where said first and second directions of said lenticulation extensions are non-coincident.

23. The radiation concentrating lens system as recited in claim 22 where said first and second directions are substantially normal each to the other.

* * * * *